United States Patent
Deutsch

[19]

[11] Patent Number: 6,159,094

[45] Date of Patent: Dec. 12, 2000

[54] LAY-DOWN BAR FOR A COTTON CLEANER

[75] Inventor: Timothy Arthur Deutsch, Newton, Iowa

[73] Assignee: Deere & Company, Moline, Ill.

[21] Appl. No.: 09/248,258

[22] Filed: Feb. 11, 1999

[51] Int. Cl.[7] .............................. A01F 12/44; B07B 1/50; B08B 5/00

[52] U.S. Cl. ..................... 460/98; 56/33; 56/29

[58] Field of Search .......................... 460/97, 98; 56/33, 56/34, 37, 29, 127, 44, 330, 28, 48, 40; 37/435

[56] References Cited

U.S. PATENT DOCUMENTS

| | | | |
|---|---|---|---|
| 3,170,277 | 2/1965 | Hubbard | 56/44 |
| 3,451,201 | 6/1969 | Grichnik | 56/44 |
| 3,757,502 | 9/1973 | Hubbard | 56/28 |
| 3,769,660 | 11/1973 | Schuette, Jr. | 19/202 |
| 4,390,376 | 6/1983 | Rood, Jr. | 134/6 |
| 4,452,134 | 6/1984 | Muse | 100/90 |
| 4,606,177 | 8/1986 | Schlueter | 56/30 |
| 4,761,941 | 8/1988 | Blackwood et al. | 56/36 |
| 4,821,496 | 4/1989 | Kysar | 56/28 |
| 5,412,930 | 5/1995 | Sheldon, Jr. | 56/44 |

*Primary Examiner*—Robert E. Pezzuto
*Assistant Examiner*—Arpad Fabian Kovacs

[57] ABSTRACT

A lay-down bar structure having one or more resilient polyurethane flaps supported by a rigid bar so that the edges of the flaps are offset slightly from the periphery of the primary cleaning drum of a cotton cleaner. The flaps are slotted and can be adjusted relative to the drum periphery. The flaps can also be stacked, and the number of flaps can be increased or decreased for a corresponding change in cleaner aggressiveness. The resilient flaps flex to allow large foreign objects to pass between the lay-down bar and the drum to thereby reduce drum damage, shock loads and plugging problems.

18 Claims, 3 Drawing Sheets

LAY-DOWN BAR FOR A COTTON CLEANER

BACKGROUND OF THE INVENTION

1) Field of the Invention

The present invention relates generally to cotton cleaning equipment, and, more specifically, to a resilient lay-down bar for a cotton cleaner.

2) Related Art

Some cotton harvesters, such as the type shown in U.S. Pat. No. 4,606,177, include a cotton cleaner for separating seed cotton from trash. The cleaner includes primary and reclaimer saw drums, each having numerous saw tooth discs incrementally spaced along a transverse driven shaft. Seed cotton and trash enter the cleaner, and a driven beater propels the material through a narrow longitudinal opening defined by the outer diameter of the drum, two end walls of the cleaner housing and a rigid U-shaped channel or lay-down bar. The lay-down bar presses the cotton upon the rotating saw teeth of the primary drum. As the primary drum rotates at high speed, the saw teeth snag the uncleaned cotton and force it through the narrow opening. The snagged cotton is impelled against several radially spaced bars to further enhance the separation of the trash from the seed cotton. The reclaimer drum, located below and similar in construction to the primary drum, provides further processing for any uncleaned cotton.

During harvesting, it is not uncommon for foreign objects such as rocks and broken parts from farm implements to enter the cleaner. If the foreign objects are too large to pass between the lay-down bar and the rotating saw-tooth drum, severe damage to the saw-teeth occurs. Without sharp saw-teeth, cleaning efficiency and machine productivity are substantially reduced. The foreign objects can also subject the cleaner to damaging shock loads as they wedge between the lay-down bar and the drum.

Previous lay-down bar structures have provided only limited adjustability of the opening, and the aggressiveness of the cleaner cannot be easily changed. Often, green bolls feed past the drums and through the cleaner. The fixed lay-down bar also establishes a prime area for plugging problems.

BRIEF SUMMARY OF THE INVENTION

It is therefore an object of the present invention to provide an improved cotton cleaner. It is a further object to provide such a cleaner which overcomes most or all of the aforementioned problems.

It is a further object of the present invention to provide a cotton cleaner having an improved lay-down bar structure. It is a further object to provide such a cleaner that is less susceptible to damage by foreign objects such as rocks and broken machine parts. It is still another object to provide such a cleaner having adjustable aggressiveness.

It is still another object to provide an improved lay-down bar structure for a cotton cleaner. It is another object to provide such a structure which is adjustable and less prone to cause blockages than at least most previously available structures. It is a further object to provide such a structure which reduces the number of green bolls that are retained with the cleaned cotton.

A cleaner constructed in accordance with the teachings of the present invention includes lay-down bar structure having one or more resilient polyurethane flaps supported by a rigid bar so that the edges of the flaps are offset slightly from the periphery of the primary cleaning drum. The flaps are slotted and can be adjusted relative to the drum periphery. The flaps can also be stacked, and the number of flaps can be increased or decreased for a corresponding change in cleaner aggressiveness.

The resilient flaps flex to allow large foreign objects to pass between the lay-down bar and the drum to thereby reduce or eliminate damage to the drum and increase cleaner productivity. Shock loads and plugging problems are also reduced by the flap structure. Fewer green bolls pass through with the cleaned cotton.

These and other objects, features and advantages of the present invention will become apparent to one skilled in the art upon reading the following detailed description in view of the drawings.

DETAILED DESCRIPTION OF THE DRAWINGS

Figure 1:
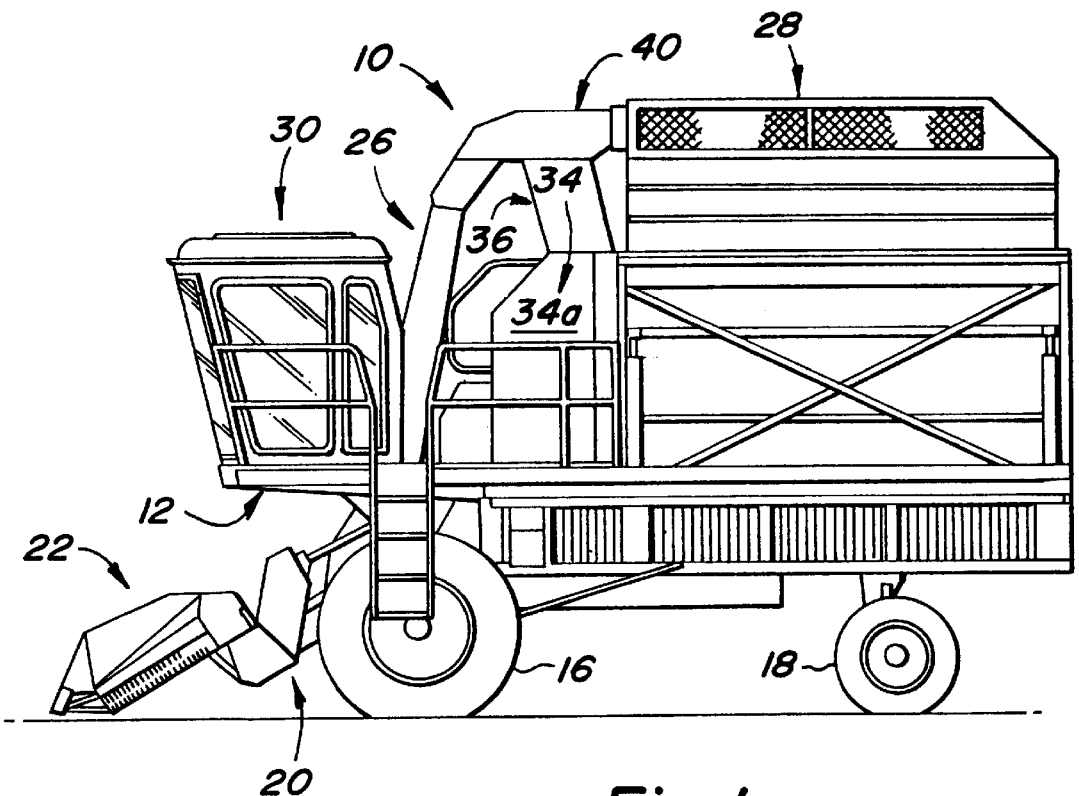
FIG. 1 is a side view of a cotton harvester with a cotton cleaner mounted on the harvester frame.

Referring now to FIG. 1, therein is shown a cotton harvester 10 of the stripper type having a fore-and-aft extending main frame 12 supported for forward movement over the ground by front drive wheels 16 and rear steerable wheels 18. A harvester head assembly 20 is supported from the forward end of the frame 12 and includes a plurality of stripper row units 22 for removing cotton bolls from cotton plants. Conveying structure 26 extends upwardly and rearwardly from the assembly 20 for moving the material gathered by the row units 22 towards a basket 28 behind a harvester cab 30.

A cotton cleaner 34 is supported on the frame 12 forwardly of the basket 28 and behind the cab 30. A connecting duct 36 extends from an upper portion of the conveying structure 26 and opens into the top of the cleaner 34. Adjustable grate and door structure 40 is located at the upper portion of the structure 26 to selectively direct the harvested material into the cleaner 34 or directly into the basket 28. The grate and door structure is generally of the type shown and described in the aforementioned U.S. Pat. No. 4,606,177 assigned to Deere & Company. With the exception of lay-down bar structure, the cleaner 34 is also generally of the same type of construction as that shown and described in the same Deere patent.

The connecting duct 36 includes an inlet portion 144 opening downwardly into the top of the cleaner 34 and an outlet duct 150 leading upwardly to the structure 40 for directing cleaned cotton into the basket 28. The inlet portion 144 distributes material uniformly across the width of the cleaner 34 onto a feeder shaft 176 extending between sidewalls 34a of the cleaner. A primary saw cylinder or drum 178 is supported for rotation below and parallel to the feeder shaft 176 by a shaft 182 extending between the cleaner sidewalls 34a. A special lay-down bar assembly 184 is supported adjacent a lower edge of a sloping panel 185 between the sidewalls 34*a*. The bar assembly 184 is located adjacent the forward upper quadrant of a toothed periphery 178*a* of the primary drum 178 and urges harvested material against the periphery. Grid bars 186 are offset radially from the drum 178 below the assembly 184. As the drum 178 is rotated at a high speed, cotton is snagged by the toothed periphery 178*a* and is forced through the narrow opening defined between the assembly 184 and the periphery. The snagged cotton is impelled against the bars 186 to separate the trash from the cotton.

A reclaimer saw cylinder or drum 190 similar in structure and operation to the drum 178 is supported for rotation by a shaft 192 parallel to the shaft 182. The reclaimer drum 190 is located below and slightly forwardly of the primary drum 178. A brush assembly 194 is supported adjacent the upper forward quadrant of the drum 190 at the lower edge of a sloped panel 195 and brushes cotton lint against toothed periphery 190*a*. Grid bars 196 similar to the bars 186 are supported adjacent the periphery 190*a* to separate trash from cotton lint. The separated trash and foreign objects fall to an auger assembly 200 which conveys the separated material out of the cleaner 34.

The cotton lint snagged on the peripheries 178*a* and 190*a* of the primary and reclaimer drums is intercepted by a doffer 208 mounted on a shaft 210 for rotation between the cleaner sidewalls 34*a* generally behind and between the drums 178 and 190. The doffer 208 doffs the cotton from the drums 178 and 190 and directs it into an upwardly directed airstream from a fan 212 and fan outlet duct 214. The cleaned cotton is directed through the cleaner outlet duct 150 back towards the basket 28. Further details of the cleaner structure may be had by reference to the aforementioned U.S. Pat. No. 4,606,177.

Figure 3:
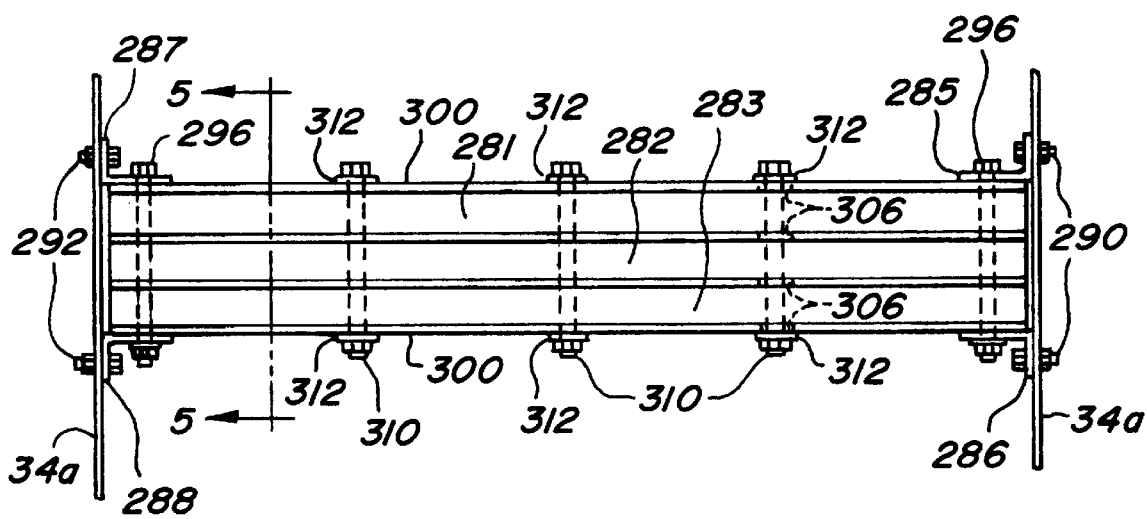
FIG. 3 is an enlarged view of the lay-down bar structure utilized with the cleaner of FIG. 2.
Figure 4:
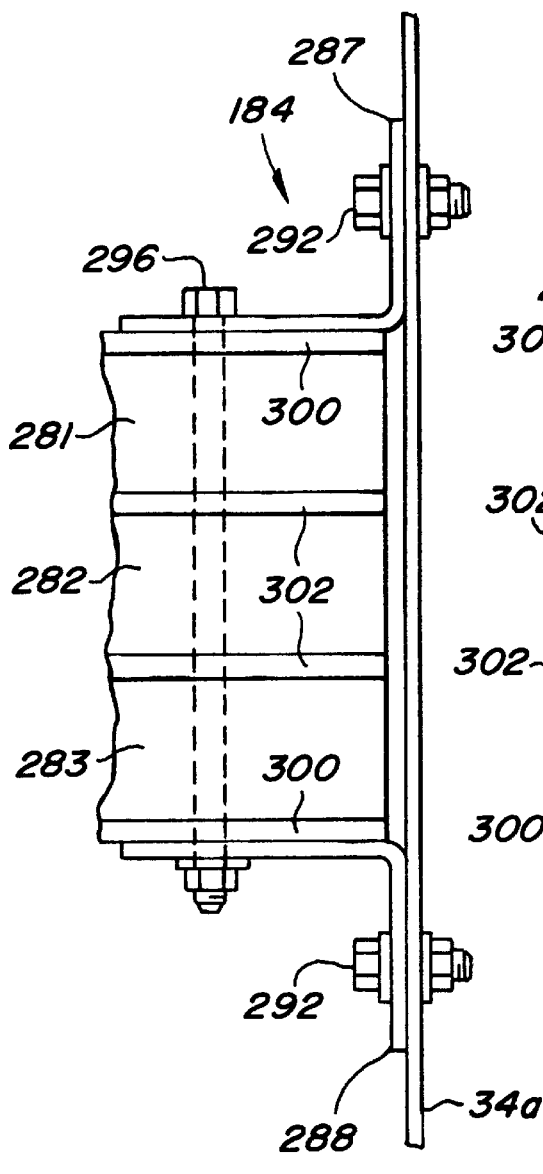
FIG. 4 is enlarged view of one end of the bar structure shown in FIG. 3.
Figure 5:
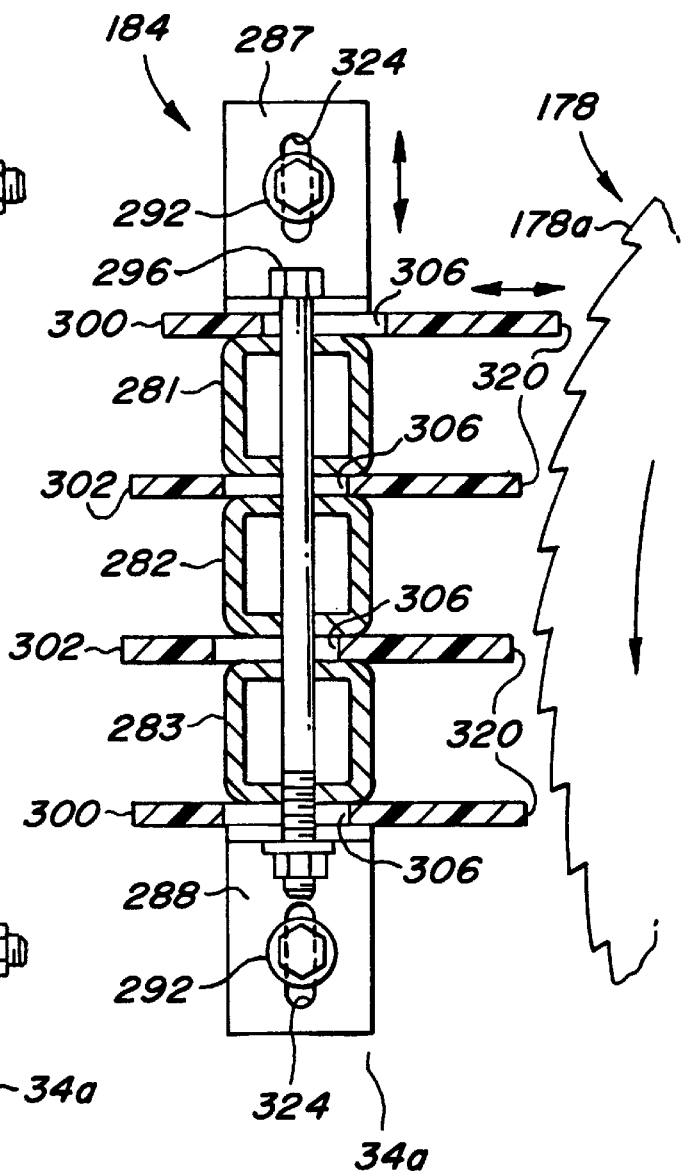
FIG. 5 is an enlarged sectional view taken generally along lines 5—5 of FIG. 3 with a portion of the primary drum periphery to show the relationship of the lay-down bar flaps relative to the drum.

Referring now to FIGS. 3–5, the lay-down bar assembly 184 will be described in further detail. A plurality of rigid, tubular bars 281, 282 and 283 extend between the cleaner sidewalls 34*a* and are supported from the sidewalls by angle brackets 285, 286, 287 and 288. The brackets 285–288 are connected to the sidewalls 34*a* by bolts 290 and 292 and to the bars 281–283 by elongated bolts 296 which pass through apertures near the ends of the bars. A plurality of flexible flaps 300 and 302 are adjustably supported by the bars 281 283. The flaps 300 and 302 are generally identical and fabricated from polyurethane sheet stock having a thickness of approximately one-eighth inch (0.3 cm.). Elongated slots 306 (FIG. 5) are provided in the opposite ends of the flaps 300 and 302 to receive the bolts 296 therethrough. Additional slots 306 are provided at uniformly spaced locations along the length of the flaps 300 and 302, and bolts 310 (FIG. 3) are inserted through holes in the tubes at these locations and through the slots 306. The innermost flaps 302 are sandwiched between the bars 281–283, and the outer flaps 300 are secured against the outer sides of the bars 281 and 283 by the end brackets 285–288 and by the bolts 310 which are tightened against washers 312. The flaps 300 and 302 are installed against the bars 281–283 so that flap edges 320 (FIG. 5) are generally equally spaced from the drum periphery 178*a* and follow the contour of the periphery.

The flaps 300 and 302 are supported by the bars 281–283 so that edges 320 are offset from the saw tooth periphery 178*a* a distance that provides optimum aggressiveness. The flaps 300 and 302 can be adjusted by loosening the bolts 296 and 310 and sliding the flaps toward or away from the periphery 178*a*. Moving the edges 320 closer to the drum 178 narrows the opening at the upper portion of the drum 178 and increases drum aggressiveness, while moving the edges the opposite direction decreases aggressiveness.

Figure 2:
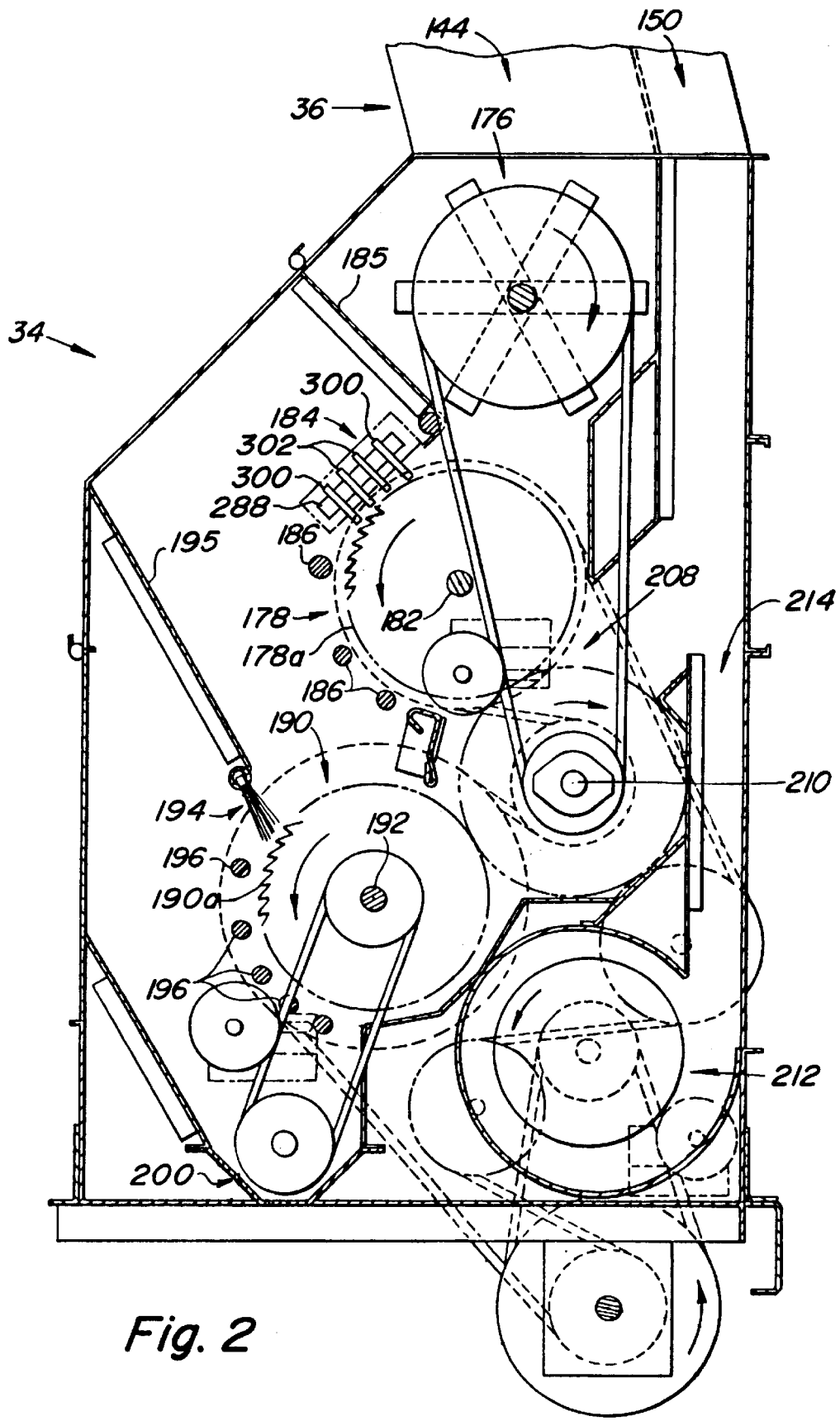
FIG. 2 is a left-hand side elevation of the cleaner shown on the harvester of FIG. 1 partially broken away to more clearly show the details of the structure.

The brackets 285–288 are slotted at 324 (FIG, 5) so the entire assembly 184 can be adjusted easily as a unit to vary aggressiveness without loosening the bolts 296 and 310. To change the gap, the operator simply loosens the bolts 290 and 292 and slides the assembly 184 up or down. Moving the assembly 184 up and to the right as viewed in FIG. 2 increases the gap between the first flap 300 and the drum 178, while moving the assembly down and to the left reduces the gap. After the desired gap setting is achieved, the bolts 290 and 292 are tightened to secure the brackets 285–288 against the sidewalls 34*a*. Additional adjustment of the drum aggressiveness is available by simply changing the number of flaps 300 and 302. Stacking more flaps on the bars increases the pressing force of the material to be cleaned against the drum 178. To reduce the force, one or more of the flaps may be removed.

If a large foreign object passes from the feeder shaft 176 into the gap area of the primary drum 178, the flaps 300 and 302 can flex to allow the object to pass without damage to the saw tooth periphery 178*a*. The flexible flap arrangement also reduces impact forces that would otherwise occur with a rigid lay-down bar assembly.

Having described the preferred embodiment, it will become apparent that various modifications can be made without departing from the scope of the invention as defined in the accompanying claims.

I claim:

1. Cotton cleaner structure adapted for removing trash from harvested cotton, the cleaner structure periodically subject to receipt of large foreign objects, the cotton cleaner structure including:

a drum having a periphery for engaging the trash and harvested cotton and rotatable about an axis;

lay-down bar structure located adjacent the drum and urging the trash and harvested cotton into contact with the drum;

wherein the lay-down bar structure includes a support offset from the drum and adjustable relative to the drum, and at least one elongated resilient flap member connected to the support and having an edge projecting from the support to a location adjacent the periphery, the location varying with adjustment of the support, the flap member flexing to allow the large foreign objects to pass between the support and the drum without damage to the drum, and wherein the resilient flap member is adjustable relative to the support to also vary the location of the edge relative to the drum.

2. The cleaner structure as set forth in claim 1 including a plurality of flap members extending from the support towards the periphery of the drum, wherein the flap members are connected to the support and offset from each other in the direction of rotation of the drum in selectively variable arrangements to thereby provide for adjustment of aggressiveness of the cleaner.

3. The cleaner structure as set forth in claim 1 wherein the flap member includes a slotted connecting portion attached to the support and permitting adjustment relative to the support in generally a radial direction relative to the drum to change the location of the edge relative to the periphery, wherein the flap member defines an angle relative to the periphery which remains generally constant with adjustment of the flap member relative to the support.

4. Cotton cleaner structure adapted for removing trash from harvested cotton, the cleaner structure periodically subject to receipt of large foreign objects, the cotton cleaner structure including:

a rotating drum having a periphery for engaging the trash and harvested cotton;

lay-down bar structure located adjacent the drum and urging the trash and harvested cotton into contact with the drum;

wherein the lay-down bar structure includes a support offset from the drum, and at least one elongated resilient flap member connected to the support and having an edge protecting from the support to a location adjacent the periphery, the flap member flexing to allow the large foreign objects to pass between the support and the drum without damage to the drum; and wherein the lay-down bar structure comprises a plurality of tubular members and the flap member includes at least two resilient flaps sandwiched between the tubular members.

5. The cleaner structure as set forth in claim 4 including bracket structure supporting the tubular members, the bracket structure adjustable to move the lay-down bar structure generally as a unit to change the location of the flaps relative to the periphery.

6. A cotton cleaner adapted for mounting on a cotton harvester and including sidewalls and an upper inlet for receiving cotton and trash as well as some foreign objects, a feeder shaft located adjacent the inlet, a cleaner drum supported for rotation about a generally horizontal drum axis between the sidewalls and below the feeder shaft, lay-down bar structure urging the cotton into contact with the cleaner drum, the lay-down bar structure including a support connected between the sidewalls at a location offset from the cleaner drum, and a flexible flap structure connected to the support and projecting towards the cleaner drum, wherein the flexible flap structure includes a plurality of elongated flexible strips extending generally parallel to the horizontal drum axis, the strips offset relative to each other in the direction of rotation of the drum.

7. The cotton cleaner as set forth in claim 6 wherein the lay-down bar structure defines a narrow opening for receiving the cotton and trash, the flexible flap structure including edges which project in a radial direction towards a peripheral portion of the drum, the flap structure flexing to enlarge the narrow opening when a foreign object larger than the opening comes between the cleaner drum and the support to thereby prevent damage to the drum, wherein the flap structure is adjustable in generally a radial direction relative to the drum to vary the distance between the edges and the peripheral portion while generally maintaining the flap structure in a preselected fixed angular relationship with the peripheral portion.

8. The cotton cleaner as set forth in claim 6 wherein the flexible strips include a slotted mounting portion permitting generally radial adjustment of the strips relative to the drum.

9. The cotton cleaner as set forth in claim 8 wherein the flexible strips comprise rectangular polyurethane strips of length generally equal to the distance between the sidewalls.

10. The cotton cleaner as set forth in claim 8 wherein the flexible strips include edges located adjacent the cleaner drum, the edges extending generally parallel to each other and to the drum axis, and wherein the edges are offset from each other in a direction of rotation of the cleaner drum.

11. The cotton cleaner as set forth in claim 10 wherein the edges generally follow the contour of the drum, and wherein the support is adjustable relative to the drum to provide adjustment of the edges relative to the drum.

12. The cotton cleaner as set forth in claim 8 wherein the support is adjustable relative to the drum to move the strips in unison relative to the drum.

13. A cotton cleaner adapted for mounting on a cotton harvester and including sidewalls and an upper inlet for receiving cotton and trash as well as some foreign objects, a feeder shaft located adjacent the inlet, a cleaner drum supported for rotation between the sidewalls and below the feeder shaft, lay-down bar structure urging the cotton into contact with the cleaner drum, the lay-down bar structure including a support connected between the sidewalls at a location offset from the cleaner drum, and a flexible flap structure connected to the support and projecting towards the cleaner drum;

wherein the flexible flap structure includes a plurality of flexible strips; and wherein the strips are individually adjustable relative to the support and the drum.

14. A cotton cleaner adapted for mounting on a cotton harvester and including sidewalls and an upper inlet for receiving cotton and trash as well as some foreign objects, a feeder shaft located adjacent the inlet, a cleaner drum supported for rotation between the sidewalls and below the feeder shaft, lay-down bar structure urging the cotton into contact with the cleaner drum, the lay-down bar structure including a support connected between the sidewalls at a location offset from the cleaner drum, and a flexible flap structure connected to the support and protecting towards the cleaner drum;

wherein the flexible flap structure includes a plurality of flexible strips;

wherein the support is adjustable relative to the drum to move the strips in unison relative to the drum; and wherein individual strips are adjustably connected to the support for movement relative to the support and to the drum.

15. A cotton cleaner adapted for mounting on a cotton harvester and including sidewalls and an upper inlet for receiving cotton and trash as well as some foreign objects, a feeder shaft located adjacent the inlet, a cleaner drum supported for rotation between the sidewalls and below the feeder shaft, lay-down bar structure urging the cotton into contact with the cleaner drum, the lay-down bar structure including a support connected between the sidewalls at a location offset from the cleaner drum, and a flexible flap structure connected to the support and projecting towards the cleaner drum;

wherein the flexible flap structure includes a plurality of flexible strips; and wherein the support comprises at least two tubular bars and the flexible strips are connected between the bars.

16. The cotton cleaner as set forth in claim 15 wherein the strips include elongated slots, and the strips are secured to the bars by bolts passing through the bars and the elongated slots, the slots facilitating adjustment of the strips relative to the bars.

17. The cotton cleaner as set forth in claim 16 including adjustable bracket structure connecting the tubular bars to the sidewalls and facilitating adjustment of the lay-down bar structure as a unit relative to the drum.

18. The cotton cleaner as set forth in claim 16 wherein the strips are selectively attachable to and removable from the bars so the number of strips supported from the bars can be varied to thereby vary the aggressiveness of the cleaner.

\* \* \* \* \*